Jan. 5, 1971 C. J. BUSHROD ET AL 3,553,019
MULTICELL ELECTRIC STORAGE BATTERY HAVING ELECTRODES FORMED
BY SPINES PROJECTING FROM THE PARTITIONS BETWEEN CELLS
Filed July 23, 1968 2 Sheets-Sheet 2

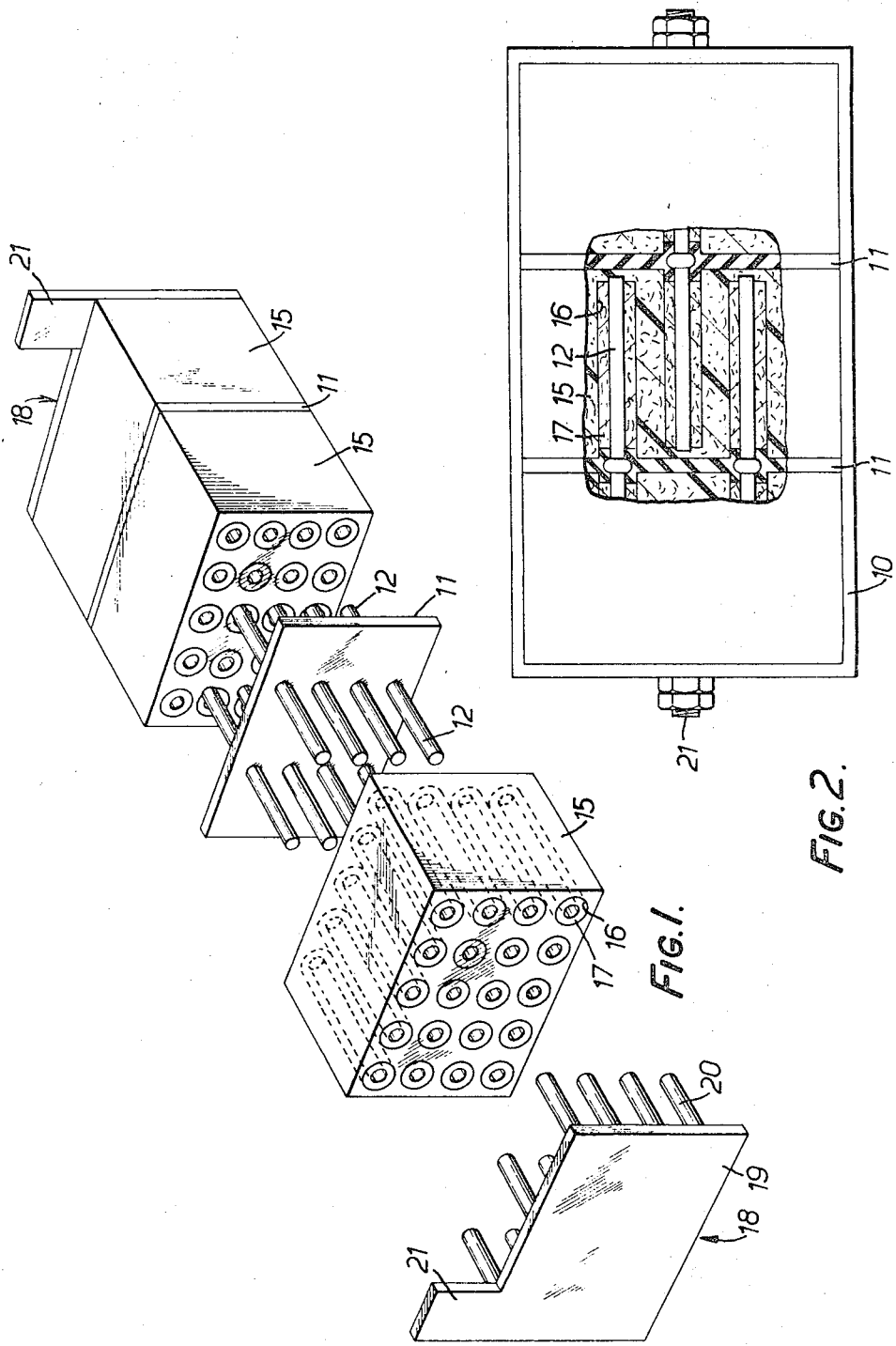

INVENTORS
CHARLES JAMES BUSHROD
PATRICK EWART McKELLEN
BY
Watson, Cole, Grindle & Watson
ATTORNEY United States Patent Office 3,553,019
Patented Jan. 5, 1971

3,553,019
MULTICELL ELECTRIC STORAGE BATTERY HAVING ELECTRODES FORMED BY SPINES PROJECTING FROM THE PARTITIONS BETWEEN CELLS
Charles J. Bushrod and Patrick Ewart McKellen, Manchester, England, assignors to Electric Power Storage Limited, Manchester, England
Filed July 23, 1968, Ser. No. 746,933
Claims priority, application Great Britain, July 26, 1967, 34,460/67
Int. Cl. H01m 13/10, 35/00
U.S. Cl. 136—6
15 Claims

ABSTRACT OF THE DISCLOSURE

In a multicell electric storage battery the electrodes are formed by spines projecting from the partitions between cells, into both the adjacent cells so that each spine in one cell is in direct connection with a spine in a neighbouring cell. Within each cell the spines projecting from one partition are surrounded by positive active material and those from the other partition by negative active material, received in bores in blocks of separator material and/or surrounded by individual separating sheaths.

---

Figure 3:
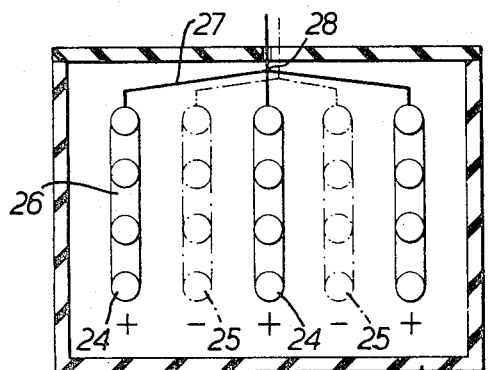

The present invention relates to multicell electric storage batteries.

According to one aspect of the present invention, in a multicell electric storage battery in which adjacent cells are separated by a partition, the electrodes of one polarity in a cell are intercalated, between those of opposite polarity so that sectional views in a plane parallel to the partition can pass through electrodes of both polarities, while electrodes of opposite polarities in neighbouring cells are connected together through the partition at a number of points distributed over the area of the partition.

Thus in one arrangement the partition may be of conducting material with electrodes of one polarity projecting from one side into one cell and electrodes of opposite polarity projecting from its opposite side into a neighbouring cell. Such an arrangement may be regarded as a type of bi-polar cell.

Preferably, however, the partition is of insulating material with the positive electrodes of one cell connected to the negative electrodes of an adjacent cell by a number of connectors passing through and sealed in openings in the partition.

Thus according to another aspect of the invention, in a multicell electric storage battery in which adjacent cells are separated by an insulating partition, the positive electrodes of one cell are connected to the negative electrodes of an adjacent cell by a number of connectors passing through the partition.

In conventional multicell electric storage batteries, electrode assemblies of opposite polarities in adjacent cells are connected by means of a single length of conductor which passes over or through the intercell partition and which is in contact at either end with the two electrode assemblies. The intercell connectors are therefore generally several centimeters long, and in order to minimize current losses, they must have rather large cross-sectional areas. In addition the current from the whole area of each plate must flow to one edge, generally to a point near one corner, and the plate must embody conductors to permit this. Thus the arrangement contributes appreciably to the overall weight of the battery, particularly in lead/acid batteries, and requires a considerable quantity of expensive conductive material. With the batteries of the present invention, savings are made in these two respects.

The electrodes may be elongated in a direction perpendicular to the partition relative to their thickness in at least one dimension parallel to the partition. Thus they may be in the form of plates but preferably they are elongated relative to the thickness in both directions parallel to the partition so that they are of rod-like form projecting generally perpendicular to the partition.

In this form of the invention, each intercell connector and the conducting spines of the pair of electrodes which it interconnects may be in line and may be formed integrally from a single length of conductor which is sealed into, and projects transversely through, the intercell partition. Each electrode may comprise a finger formed by a conducting spine surrounded by active material which in turn is surrounded by insulating material serving to separate it from adjacent electrodes. The insulating material may comprise a block of separator material containing a number of bores, adapted to receive the electrodes of a cell assembly.

The block of separator material may then serve also to support the electrodes which together make up the cell assembly. This would mean that the intercell connectors need not have the mechanical strength necessary in conventional batteries. In the case of lead/acid batteries, pure lead could then be used instead of the more usual lead-antimony alloy, thus obviating the antimony transfer problems associated with such alloys.

The blocks of separator material, which must be porous to allow electrolyte to reach the electrodes, may be made by extrusion of a dough of a polymeric plastics material and a diatomaceous earth, for example a dough of polystyrene resin and kieselguhr. Alternatively, the blocks may be in the form of laminated sheets of conventional porous separator material, such as the microporous polyvinyl chloride material sold under the trademark Porvic.

Alternatively or in addition each finger comprising a conducting spine surrounded by active material may be confined within a separate tubular sheath of separator material.

The intercell partitions are conveniently made from a polymeric plastics material, one which possesses the necessary mechanical strength and which can be injection moulded and sealed to the battery container. Polystyrenes or polycarbonates are suitable. Alternatively thermosetting materials such as phenolic resins may be used.

Figure 4:
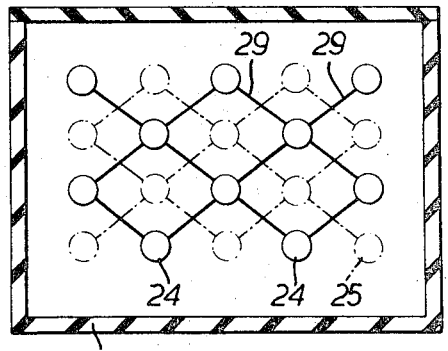
Figure 5:
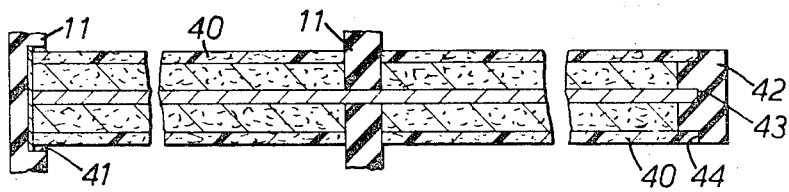
Figure 6:
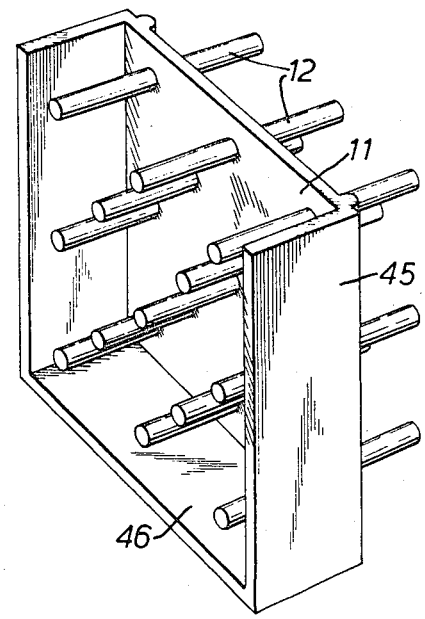

The invention may be put into practice in various ways but certain specific embodiments will be described by way of example with reference to the accompanying drawings in which:

FIG. 1 is an exploded perspective view of the element, comprising plates and separators, of an electric storage battery, FIG. 2 is a plan view of the battery with certain parts shown in section, FIG. 3 is a diagrammatic end view of the battery showing the pattern of positive and negative spines and their manner of connection, FIG. 4 is a view similar to FIG. 3 of a modified pattern, FIG. 5 is a fragmentary sectional view illustrating an arrangement in which each finger of active material is surrounded by a separate separator sheath, and FIG. 6 is a diagrammatic perspective view of an arrangement in which segments of the container are formed integrally with each partition.

The invention is shown as applied to a multicell lead-acid starter batery for motor vehicles in which the cells constituting the battery are housed in a container 10 similar to the usual type of container but having no integral internal partitions. As shown in FIG. 1 sheets of insulating material, which are to form the internal partitions 11, are cast from thermo-plastic material around a number of rods or spines 12 of lead, so that the spines project transversely from both sides of each partition perpendicular to it. The spines are so arranged that those supported in one partition will be intercalated between those supported by an adjacent partition, without touching them.

Blocks of separator material 15 of approximately the internal dimensions of each cell are extruded from a dough consisting of polystyrene and kieselguhr to incorporate a number of transverse bores 16 equal to the number of spines projecting from the two partitions between which each block is placed.

The polystyrene/kieselguhr dough is compounded so that the extruded block of material is permeable to liquid. Suitable compositions are described in U.S. patent application Ser. No. 584,177 filed Oct. 4, 1966, now Pat. No. 3,486,946.

Each bore of each separator block is disposed so as to be able to receive one of the spines with a clearance round it for active material. A quantity of active material of the appropriate polarity is placed in the bores and the two assemblies of spines which are separated by each block are inserted into them, one assembly from one side and the other assembly from the other. The spines of one assembly will make contact with active material of one polarity only, while those of the other assembly will make contact with active material of the opposite polarity only.

The active material may be incorporated in any convenient manner, in particular it may be either placed in the bores before the spines are inserted into them or it may be applied directly to each spine, the spines then being inserted into the bores of the separator block.

The electrode assembly of each of the two outermost cells is constituted by the spines projecting through the partition insulating it from the adjacent cell and by an end plate electrode assembly 18 comprising a sheet 19 of conducting material, from which an appropriately ordered array of spines 20 projects in one direction only. A battery terminal post 21 is connected to each end plate.

After assembly, the element is inserted in the casing and each intercell partition is sealed to it, thereby forming a liquid tight compartment.

The bores in the blocks of separator material may extend completely through the block or alternatively they may be blind, each bore being open towards the partition from which a spine will extend into it.

The precise distribution or pattern of spines may vary in accordance with requirements. It is preferred that, as indicated in FIGS. 1 and 2, each partition should have the spines on opposite sides of it opposite one another, that is to say constituted by a single rod of lead passing straight through the partition. For this purpose rods of lead, each of which may if desired be provided with a protuberance to key it in position when embedded in the partition, are placed in the mould and the partition is then moulded about them so that they project from opposite faces of it. The mould may be formed so as to produce a collar or boss projecting from the face of the partition around each spine so as to enter the end portion of the bore in the separator material and locate it in relation to the partition, in addition to strengthening the partition at the point where the spine is embedded in it. Moreover where the bore in the separator material is blind it may have in its end a counter-bore to receive the end of the spine and locate it centrally in relation to the active material.

One pattern of spines is shown diagrammatically in FIG. 3 which shows five columns each comprising four fingers of active material. In this particular pattern the fingers 24 shown in full lines and located in the first, third and fifth columns, incorporate positive active material, while the fingers 25 shown in dotted lines, and located in the second and fourth columns, incorporate negative active material in a particular cell. It will be appreciated that in a neighbouring cell the fingers 24 will incorporate negative active material and the fingers 25 will incorporate positive active material. In such a case, where the number of fingers of one polarity differs from that of the other polarity it may be desirable to vary the sizes of the bores so as to adjust the amount of active material.

FIG. 3 also shows an alternative method of making the end connections. Thus the conducting plate 19 is omitted and the spines of a given polarity are connected by a conductor 26 extending up each column, and a conductor 27 interconnecting the columns and connecting them to a terminal post 28.

FIG. 4 shows an alternative pattern in which alternate fingers in each vertical column are of one polarity and similarly alternate fingers in each horizontal row are of the same polarity. Thus in the odd columns the odd fingers, and in the even columns the even fingers, are shown in full lines and are of one polarity, say positive, while the even fingers in the odd columns and the odd fingers in the even columns are of the other polarity, say negative. Such an arrangement gives the same number of positive fingers as negative fingers and each finger of one polarity is surrounded on all sides by fingers of the opposite polarity. The arrangement of FIG. 4 also has the advantage that all the partitions between cells may be identical in construction, the interleaving of the spines being achieved by inverting alternate partitions. Thus it will be noted that if the pattern shown in FIG. 4 is inverted the positive spines take the place of the negative spines and vice versa. A similar result can be achieved with the arrangement of FIG. 3 by providing an additional column of spines and reversing alternate partitions about a vertical axis.

In the arrangement of FIG. 4 the spines of the end plate assembly may be interconnected by a network 29 of conductors extending diagonally in the manner indicated.

It will be appreciated that the conductors 26 and 27 of FIG. 3 and the conductors 29 of FIG. 4 may be embedded in an insulating partition which may form the end wall of the container.

For purposes of clarity the drawings only show twenty spines, ten in each partition, but it will be appreciated that the number of spines may be varied as required.

In an alternative embodiment of the invention, illustrated in FIG. 5, the bored blocks of separator material are replaced by individual porous sheaths 40, one around each finger formed by a spine embedded in active material. The sheaths serve the same purpose as the blocks 15 of separator material in preventing short circuiting of the electrodes due either to direct contact or to displaced active material. The sheaths 40 may be made from Terylene tubing. FIG. 5 shows two different ways in which the active material may be confined in the sheath and the end of the finger may be closed. In the arrangement shown on the left the finger constituted by the spine 12 the active material 17 and the porous sheath 40 is received in a circular recess 41 in the neighboring intercell partition. In the arrangement shown on the right the end of the finger is closed by means of an insulating plug 42 which has a central blind hole 43 to receive the end of the spine, and which fits into the porous sheath 40 and has a shoulder 44 to limit the extent to which it does so.

In a further embodiment of the invention shown in FIG. 6 the side walls 45 and bottom 46 of each cell are integral with one of the adjacent intercell partitions. The cell units may then be nested together before insertion into the battery container, or alternatively they may be nested and sealed together, along with appropriate end units, so as to dispense with the need for a battery container at all.

It will be appreciated that the invention is not limited to the embodiments specifically described. In particular the features described may be combined, for example the fingers may be provided with individual separator sheaths as in FIG. 5 and also received in bores in a separator block providing them with mechanical support as in FIGS. 1 and 2. In this case the block may be built up of laminations, for example of a microporous polyvinyl chloride sheet such as that sold under the trademark Porvic, in which the bores may be formed by drilling.

What we claim as our invention and desire to secure by Letters Patent is:

1. A multicell electric storage battery having adjacent cells separated by a partition, comprising; electrodes of one polarity in a cell intercalated between those of opposite polarity so that electrodes of both polarities intersect planes substantially parallel to the partition, conducting means interconnecting electrodes of opposite polarities in neighbouring cells, said conducting means affording conducting paths through the partion at a number of points distributed over the area of the partition, to connect the cells in series.

2. A battery as claimed in claim 1 in which the partition is of conducting material with electrodes of one polarity projecting from one side into one cell and electrodes of opposite polarity projecting from its opposite side into a neighbouring cell.

3. A battery as claimed in claim 1 in which the partition is of insulating material having openings therein, said conducting means comprise a number of connectors passing through and sealed in said openings to interconnect the positive electrodes of one cell with the negative electrodes of an adjacent cell.

4. A battery as claimed in claim 1 in which the electrodes are elongated in a direction perpendicular to the partition relative to their thickness in at least one dimension parallel to the partition.

5. A battery as claimed in claim 4 in which the elongation of said electrodes is relative to their thickness in all directions parallel to the partition so that they are of essentially rod-like form projecting generally perpendicular to the partition.

6. A battery as claimed in claim 5 in which each electrode comprises a conducting spine carrying active material, and each intercell connector and the conducting spines of the pair of electrodes which it interconnects are in line and are formed integrally from a single length of conductor which is sealed into and projects transversely through the intercell partition.

7. A battery as claimed in claim 5 in which each electrode comprises a finger formed by a conducting spine surrounded by active material, and further comprising insulating material enclosing said active material to insulate said electrodes.

8. A battery as claimed in claim 7 in which the insulating material comprises a block of separator material containing a number of bores for receiving the electrodes of a cell.

9. A battery as claimed in claim 8 in which each block of separator material is made from a dough including polymeric plastic and diatomaceous earth materials.

10. A battery as claimed in claim 8 in which each block of insulating material is laminated.

11. A battery as claimed in claim 7 in which each finger is confined within a separate tubular sheath of separator material.

12. A battery as clamied in claim 3 in which the intercell partitions are formed of a polymeric plastics material.

13. A battery as claimed in claim 5 in which the pattern of spines in neighbouring partitions is the same but is such that by reversing one partition the spines are intercalated.

14. A battery as claimed in claim 5 in which each intercell partition is formed integrally with side and bottom walls.

15. A battery as claimed in claim 4 in which the electrodes are in the form of plates lying in parallel planes perpendicular to the partition.

References Cited

UNITED STATES PATENTS

| | | | |
|---|---|---|---|
| 408,002 | 7/1889 | Ernst | 136—134X |
| 3,198,990 | 8/1965 | Katzin | 317—100 |
| 3,228,798 | 1/1966 | Hart | 136—86 |
| 3,304,708 | 2/1967 | Baehni | 136—114X |
| 3,309,232 | 3/1967 | Wilson | 136—134 |

FOREIGN PATENTS

| | | | |
|---|---|---|---|
| 197,204 | 5/1923 | Great Britain | 136—145 |

WINSTON A. DOUGLAS, Primary Examiner

A. SKAPARS, Assistant Examiner

U.S. Cl. X.R.

136—134